United States Patent
Anglin et al.

(10) Patent No.: US 9,488,071 B2
(45) Date of Patent: Nov. 8, 2016

(54) PISTON RING ANTI-ROTATION

(71) Applicant: United Technologies Corporation, Hartford, CT (US)

(72) Inventors: Christopher T. Anglin, Manchester, CT (US); Yuk-Kwan Brian Yuen, Wethersfield, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 14/670,950

(22) Filed: Mar. 27, 2015

(65) Prior Publication Data

US 2016/0281536 A1 Sep. 29, 2016

(51) Int. Cl.
| | |
|---|---|
| *F16C 27/04* | (2006.01) |
| *F01D 25/16* | (2006.01) |
| *F16C 33/76* | (2006.01) |
| *F16C 19/24* | (2006.01) |
| *F16C 35/04* | (2006.01) |
| *F16C 23/08* | (2006.01) |

(52) U.S. Cl.
CPC ............. *F01D 25/164* (2013.01); *F16C 19/24* (2013.01); *F16C 23/088* (2013.01); *F16C 33/768* (2013.01); *F16C 35/042* (2013.01); *F05D 2220/32* (2013.01); *F05D 2240/54* (2013.01); *F05D 2240/55* (2013.01); *F05D 2260/96* (2013.01)

(58) Field of Classification Search
CPC .............................. F16C 27/04; F16C 27/045
USPC .......................................... 384/99, 535, 581
See application file for complete search history.

(56) References Cited

U.S. PATENT DOCUMENTS

| | | | |
|---|---|---|---|
| 4,084,861 A | 4/1978 | Greenberg et al. | |
| 4,781,077 A | 11/1988 | El-Sahfei | |
| 4,952,076 A | 8/1990 | Wiley, III et al. | |
| 5,197,807 A * | 3/1993 | Kuznar ................. | F01D 25/164 277/645 |
| 5,228,784 A | 7/1993 | Bobo | |
| 6,131,914 A | 10/2000 | Proveaux | |
| 7,648,278 B2 | 1/2010 | Stout et al. | |
| 7,731,426 B2 | 6/2010 | Meacham et al. | |
| 8,182,156 B2 | 5/2012 | Kinnaird et al. | |
| 8,894,286 B2 | 11/2014 | Nicholas et al. | |
| 2006/0083449 A1* | 4/2006 | Laurant ................... | F16C 27/04 384/99 |
| 2007/0110351 A1 | 5/2007 | Larue | |
| 2013/0108202 A1 | 5/2013 | Do et al. | |

FOREIGN PATENT DOCUMENTS

GB     2089442 A     6/1982

OTHER PUBLICATIONS

Extended European Search Report, for European Patent Application No. 16162553.8, dated Aug. 9, 2016, 8 pages.

* cited by examiner

*Primary Examiner* — Phillip A Johnson
(74) *Attorney, Agent, or Firm* — Kinney & Lange, P.A.

(57) ABSTRACT

A squeeze film damper bearing assembly includes a bearing and a squirrel cage radially outward of and supporting the bearing. The squirrel cage includes a first piston ring groove, a second piston ring groove, and a first pocket connected to the first piston ring groove. The squeeze film damper bearing assembly also includes a first piston ring configured to fit into the first piston ring groove. The first piston ring includes a first end circumferentially spaced apart from a second end and an ear configured to fit into the first pocket to prevent the first piston ring from rotating in the first piston ring groove. The squeeze film damper bearing assembly also includes a second piston ring configured to fit into the second piston ring groove and a stationary housing radially outward of the squirrel cage.

20 Claims, 4 Drawing Sheets

PISTON RING ANTI-ROTATION

BACKGROUND

This disclosure relates to gas turbine engines, and more specifically a squeeze film damper bearing assembly for a gas turbine engine.

Squeeze film damping can be used in a bearing assembly that supports a rotatable compressor or turbine shaft of a gas turbine engine. The bearing is contained within a stationary housing. A bearing centering spring, or squirrel cage, within the stationary housing supports the bearing. The squirrel cage is connected to the stationary housing such that the squirrel cage does not rotate relative to the stationary housing but is flexible enough to bend in response to the loads from the bearing. A film of liquid, such as oil, is supplied to an annulus between the stationary housing and the squirrel cage. When the compressor or turbine shaft rotates, unbalanced loads can cause excessive vibration in the shaft. As the bearing moves with the rotation of the shaft, the squirrel cage vibrates or whirls within the stationary housing and squeezes the oil in the annulus, which dampens the vibration of the shaft.

The squirrel cage includes grooves for piston rings, which create a seal between the squirrel cage and the stationary housing to contain the oil in the annulus between the squirrel cage and the stationary housing. The piston rings are split so that the piston rings can be installed in the grooves on the squirrel cage. The oil in the annulus leaks out through the gaps between the ends of the piston rings and more oil is supplied to the annulus. When the squirrel cage vibrates or whirls, the piston rings can rotate in their grooves and the corners of the ends of the piston rings can wear or machine a groove into the bore of the stationary housing or the grooves of the squirrel cage, causing the squeeze film damper to no longer function properly.

In order to prevent the piston rings from wearing a groove into the bore of the stationary housing, a sleeve of wear-resistant material can be placed in between the squirrel cage and the stationary housing such that the stationary housing is not worn when the piston rings rotate. However, the sleeve adds weight and consumes radial space, limiting the ability to fit the necessary hardware with proper cross sectional thickness to avoid part failure. Another option is to drill holes through the hoop of the squirrel cage and attach pins that fit into the gaps between the piston rings to prevent the piston rings from rotating. However, adding holes through the squirrel cage for the pins creates a stress riser in an already highly-stressed part. The squirrel cage may not be able to be made thick enough to deal with the stress concentration due to lack of radial space.

SUMMARY

A squeeze film damper bearing assembly includes a bearing and a squirrel cage radially outward of and supporting the bearing. The squirrel cage includes a first piston ring groove, a second piston ring groove, and a first pocket connected to the first piston ring groove. The squeeze film damper bearing assembly also includes a first piston ring configured to fit into the first piston ring groove. The first piston ring includes a first end circumferentially spaced apart from a second end and an ear configured to fit into the first pocket to prevent the first piston ring from rotating in the first piston ring groove. The squeeze film damper bearing assembly also includes a second piston ring configured to fit into the second piston ring groove and a stationary housing radially outward of the squirrel cage.

A squirrel cage assembly includes a squirrel cage with a first piston ring groove, a second piston ring groove, a first pocket connected to the first piston ring groove, and a second pocket connected to the second piston ring groove. The squirrel cage assembly also includes a first piston ring configured to fit into the first piston ring groove and a second piston ring configured to fit into the second piston ring grooves. The first piston ring includes a first end circumferentially spaced apart from a second end and a first ear configured to fit into the first pocket to prevent the first piston ring from rotating in the first piston ring groove. The second piston ring includes a first end circumferentially spaced apart from a second end and a first ear configured to fit into the second pocket to prevent the second piston ring from rotating in the second piston ring groove.

DETAILED DESCRIPTION

The present disclosure relates to anti-rotation of piston rings on a squirrel cage of a squeeze film damper bearing assembly. The piston rings include ears that fit into pockets in the squirrel cage that are connected to piston ring grooves of the squirrel cage. The ears prevent the piston rings from rotating around the squirrel cage when the squirrel cage vibrates or whirls. This prevents the ends of the piston rings from wearing a groove into the stationary housing of the squeeze film damper bearing assembly. This piston ring anti-rotation arrangement eliminates the need for a protective sleeve to protect the stationary housing and eliminates the need for drilling holes through the squirrel cage for anti-rotation pins.

Figure 1:
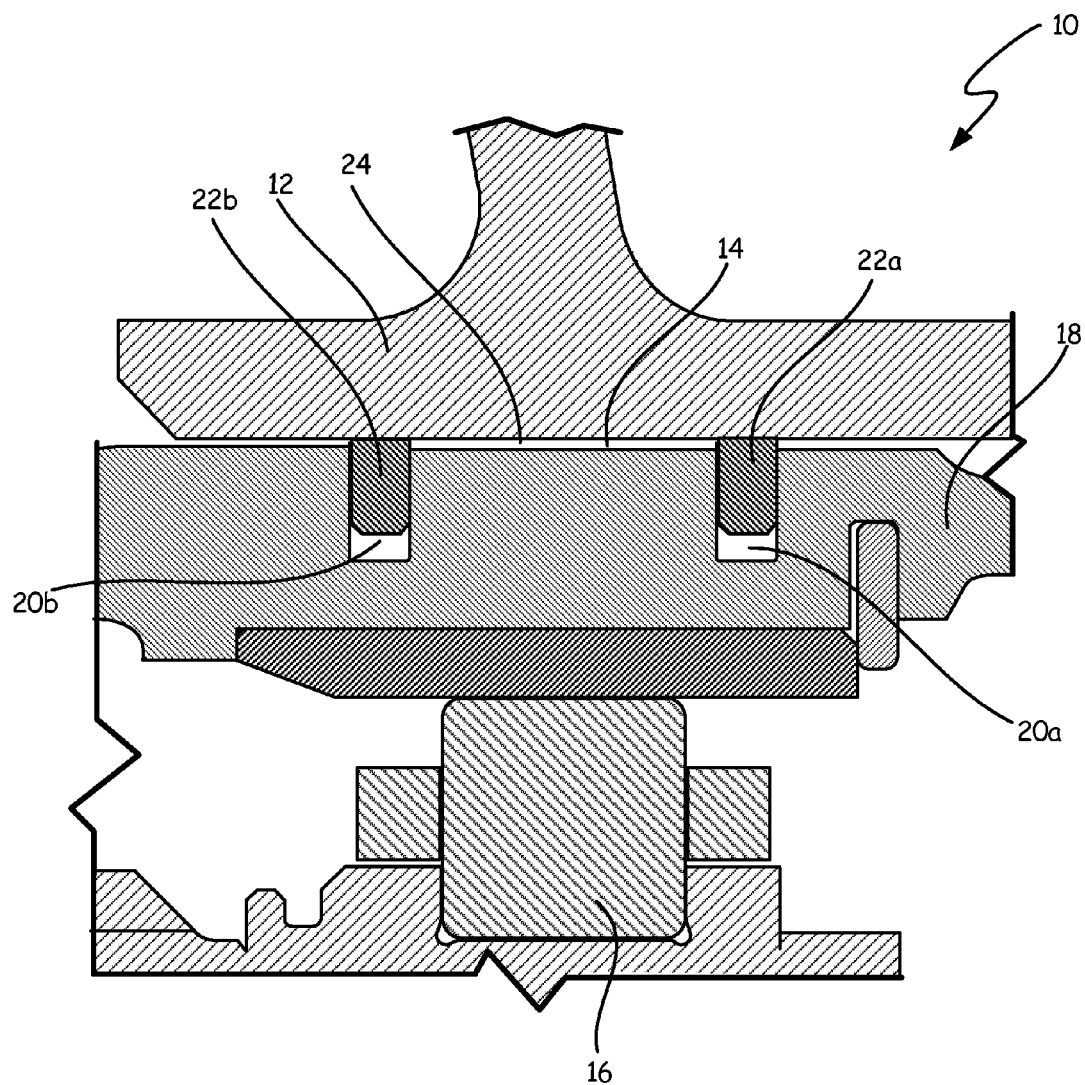
FIG. 1 is a cross-sectional view of a squeeze film damper bearing assembly.

FIG. 1 is a cross-sectional view of squeeze film damper bearing assembly 10. Squeeze film damper bearing assembly 10 includes stationary housing 12 with bore 14, bearing 16, squirrel cage 18 with piston ring grooves 20a and 20b, and piston rings 22a and 22b. Squirrel cage 18 is located radially inward of stationary housing 12 within bore 14. Bearing 16 is located radially inward of squirrel cage 18. Squirrel cage 18 supports bearing 16 and is connected to stationary housing 12 such that squirrel cage 18 does not rotate relative to stationary housing 12. Piston rings 22a and 22b fit into piston ring grooves 20a and 20b, respectively, of squirrel cage 18. Piston rings 22a and 22b are split rings, each having two ends with a gap in between (shown in FIGS. 2A-4). Piston rings 22a and 22b create a seal between squirrel cage 18 and stationary housing 12, forming annulus 24.

Bearing 16 can support a rotatable shaft (not shown), such as a rotatable compressor or turbine shaft of a gas turbine engine. Stationary housing 12 includes a passage (not shown) through which oil is pumped into annulus 24. The oil in annulus 24 slowly leaks out of annulus 24 through the gaps in piston rings 22a and 22b. When a shaft supported by bearing 16 rotates, an unbalanced load can cause excessive vibration of the shaft. Due to the motion of the shaft, squirrel cage 18 whirls and/or vibrates within stationary housing 12. The motion of squirrel cage 18 squeezes the oil in annulus 24 between squirrel cage 18 and stationary housing 12, damping the vibration of the shaft.

Stationary housing 12 can be made of a softer material, such as titanium. Piston rings 22a and 22b can be made of a harder material, such as cast iron. Piston rings 22a and 22b have anti-rotation features (discussed in detail with respect to FIGS. 2A-4) that prevent the ends of piston rings 22a and 22b from wearing grooves into stationary housing 12. This anti-rotation arrangement of piston rings 22a and 22b eliminates the need for a protective sleeve to protect stationary housing 12 and eliminates the need for drilling holes through squirrel cage 18 for anti-rotation pins.

Figure 2A:
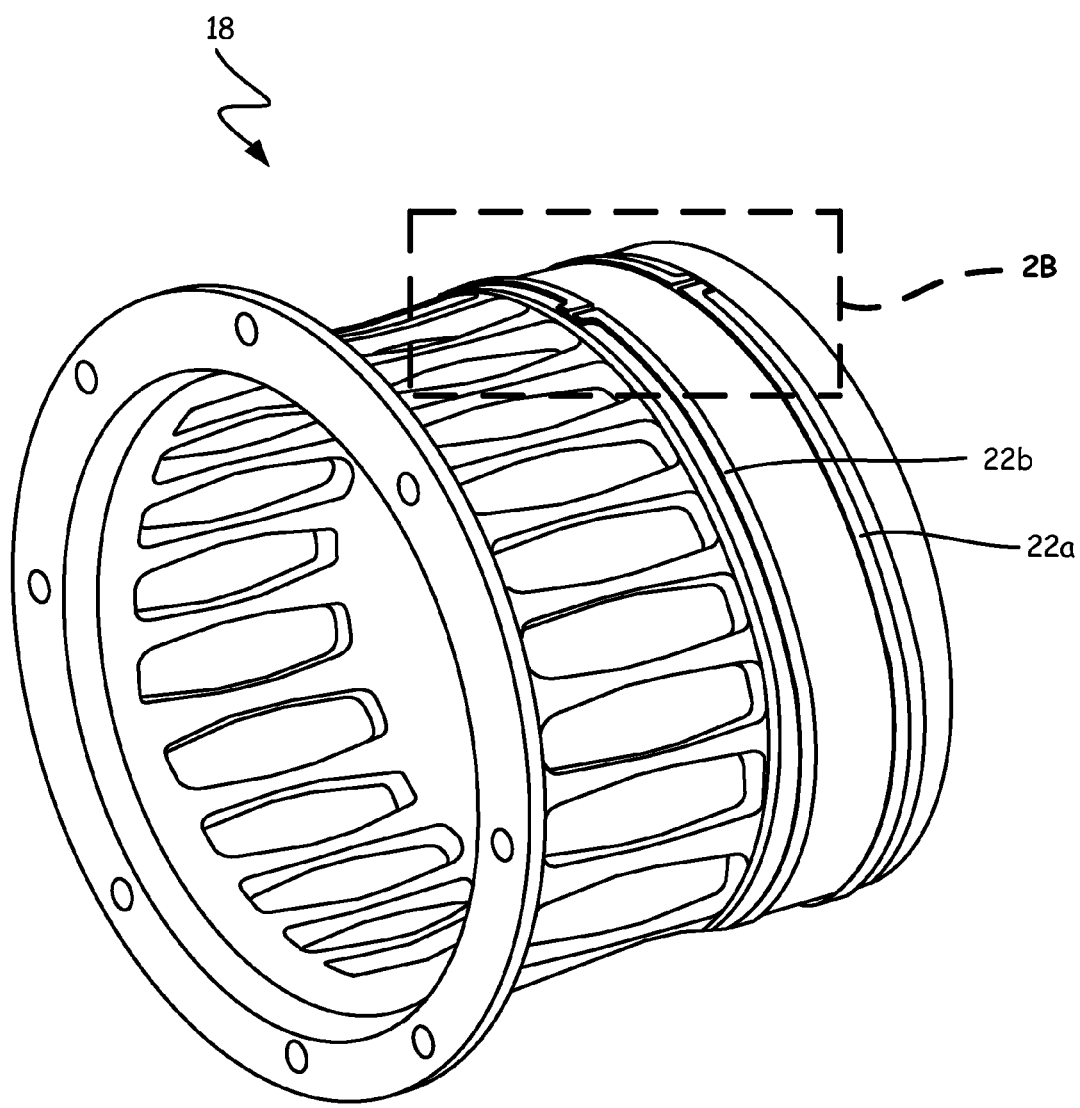
FIG. 2A is a perspective view of the squirrel cage and piston rings of the squeeze film damper bearing assembly in FIG. 1.
Figure 2B:
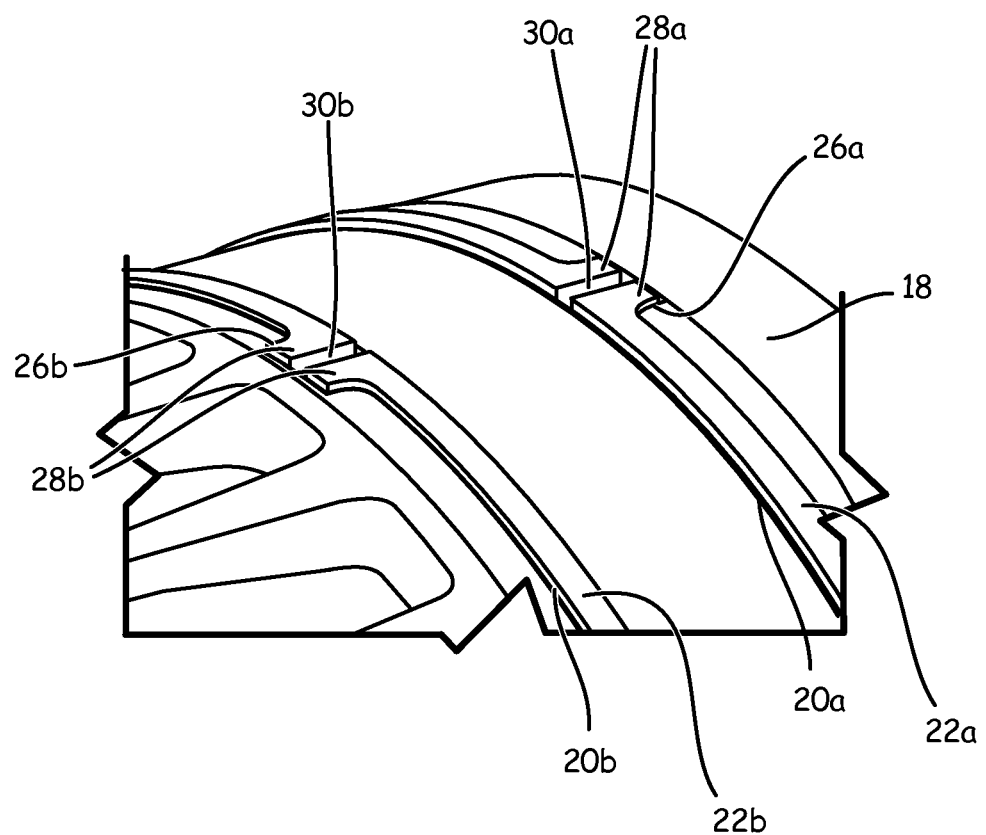
FIG. 2B is an enlarged perspective view of detail 2B of the squirrel cage and piston rings in FIG. 2A.

FIG. 2A is a perspective view of squirrel cage 18 and piston rings 22a and 22b of squeeze film damper bearing assembly 10, shown in FIG. 1. FIG. 2B is an enlarged perspective view of detail 2B of squirrel cage 18 and piston rings 22a and 22b, shown in FIG. 2A. As shown in FIGS. 2A and 2B, squirrel cage 18 includes piston ring grooves 20a and 20b and pockets 26a and 26b. Pockets 26a and 26b are connected to piston ring grooves 20a and 20b, respectively. Piston rings 22a and 22b include ears 28a and 28b, respectively. In the embodiment shown, ears 28a and 28b face away from each other. In an alternative embodiment, ears 28a and 28b can face each other. In another embodiment, ears 28a and 28b can face in the same direction. Gaps 30a and 30b separate the circumferentially spaced apart ends of piston rings 22a and 22b, respectively. Ears 28a are connected to each of the ends of piston ring 22a, and ears 28b are connected to each of the ends of piston ring 22b.

Gaps 30a and 30b allow the ends of piston rings 22a and 22b to be opened to enlarge piston rings 22a and 22b such that piston rings 22a and 22b can be installed on squirrel cage 18. When piston rings 22a and 22b are installed on squirrel cage 18, piston rings 22a and 22b fit into piston ring grooves 20a and 20b, respectively, and ears 28a and 28b are aligned with and fit into pockets 26a and 26b, respectively. Ears 28a and 28b prevent piston rings 22a and 22b from rotating around squirrel cage 18. This anti-rotation arrangement prevents the ends of piston rings 22a and 22b from wearing grooves into stationary housing 12 of squeeze film damper bearing assembly 10 (shown in FIG. 1). The anti-rotation of piston rings 22a and 22b eliminates the need for placing a wear-resistant sleeve between squirrel cage 18 and stationary housing 12. Furthermore, pockets 26a and 26b eliminate the need to drill holes through squirrel cage 18 for anti-rotation pins. This prevents the creation of a stress riser in an already highly-stressed part.

Figure 3:
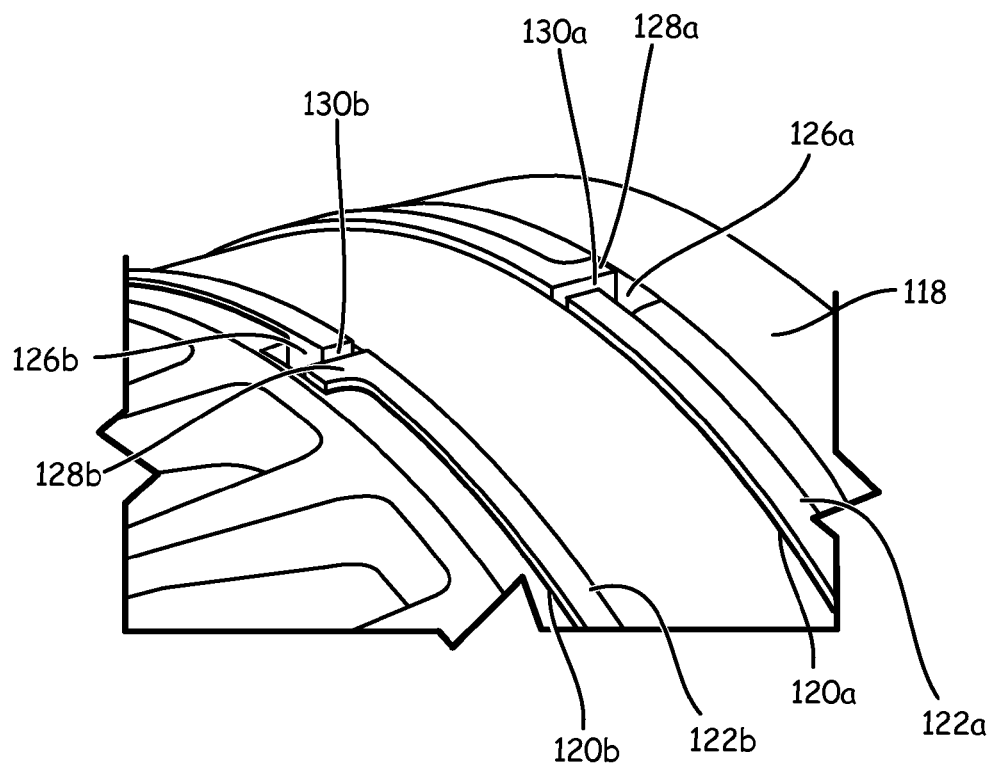
FIG. 3 is an enlarged perspective view of an alternate embodiment of the squirrel cage and piston rings in FIG. 2B.

FIG. 3 is an enlarged perspective view of squirrel cage 118 and piston rings 122a and 122b, an alternate embodiment of squirrel cage 18 and piston rings 22a and 22b, shown in FIG. 2B. Squirrel cage 118 includes piston ring grooves 120a and 120b and pockets 126a and 126b. Pockets 126a and 126b are connected to piston ring grooves 120a and 120b, respectively. Piston rings 122a and 122b include ears 128a and 128b, respectively. In the embodiment shown, ear 128a faces away from ear 128b. In an alternative embodiment, ear 128a can face ear 128b. In another embodiment, ears 128a and 128b can face in the same direction. Gaps 130a and 130b separate the circumferentially spaced apart ends of piston rings 122a and 122b, respectively.

The anti-rotation arrangement shown in FIG. 3 functions in the same manner as the arrangement shown in FIGS. 2A and 2B, except piston ring 122a has a single ear (128a), and piston ring 122b also has a single ear (128b). Ear 128a is connected to one of the ends of piston ring 122a, and ear 128b is connected to one of the ends of piston ring 122b. Ears 128a and 128b prevent piston rings 122a and 122b from rotating around squirrel cage 118.

Figure 4:
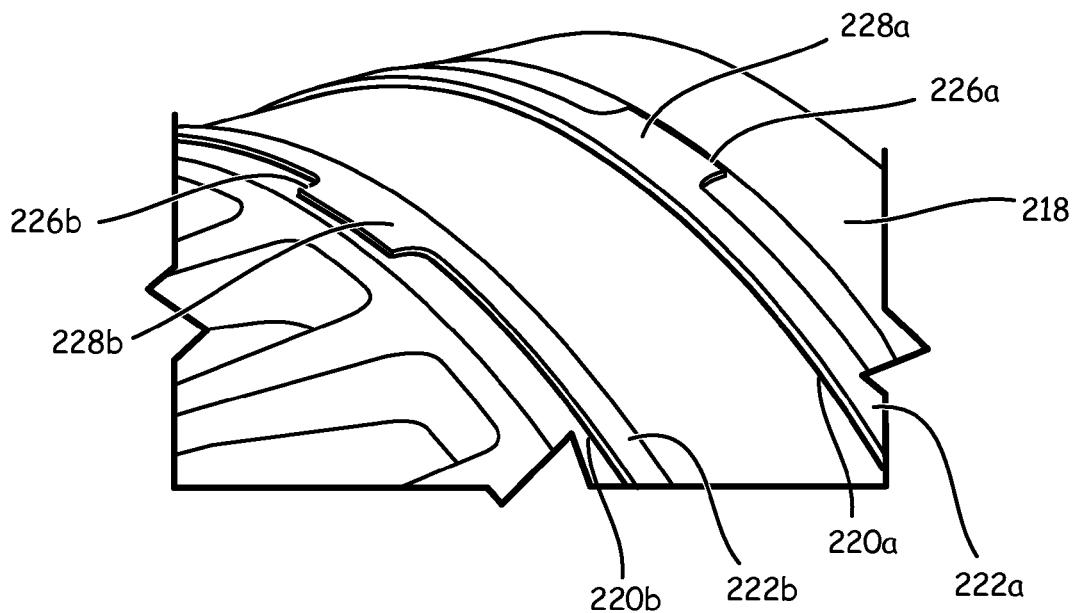
FIG. 4 is an enlarged perspective view of another alternate embodiment of the squirrel cage and piston rings in FIG. 2B.

FIG. 4 is an enlarged perspective view of squirrel cage 218 and piston rings 222a and 222b, another alternate embodiment of squirrel cage 18 and piston rings 22a and 22b, shown in FIG. 2B. Squirrel cage 218 includes piston ring grooves 220a and 220b and pockets 226a and 226b. Pockets 226a and 226b are connected to piston ring grooves 220a and 220b, respectively. Piston rings 222a and 222b include ears 228a and 228b, respectively. In the embodiment shown, ear 228a faces away from ear 228b. In an alternative embodiment, ear 228a can face ear 228b. In another embodiment, ears 228a and 228b can face in the same direction. Piston rings 222a and 222b include circumferentially spaced apart ends separated by a gap (not shown in FIG. 4).

The anti-rotation arrangement shown in FIG. 4 functions in the same manner to the arrangement shown in FIG. 3, except ear 228a is not connected to one of the ends of piston ring 222a, and ear 228b is not connected to one of the ends of piston ring 222b. In one embodiment, ears 228a and 228b can be spaced 180 degrees from the ends of piston rings 222a and 222b. In another embodiment, ears 228a and 228b can be spaced 90 degrees from the ends of piston rings 222a and 222b. In other embodiments, ears 228a and 228b can be spaced varying degrees away from the ends of piston rings 222a and 222b.

Discussion of Possible Embodiments

The following are non-exclusive descriptions of possible embodiments of the present invention.

A squeeze film damper bearing assembly according to an exemplary embodiment of this disclosure, among other possible things includes a bearing and a squirrel cage radially outward of and supporting the bearing. The squirrel cage includes a first piston ring groove, a second piston ring groove, and a first pocket connected to the first piston ring groove. The squeeze film damper bearing assembly also includes a first piston ring configured to fit into the first piston ring groove. The first piston ring includes a first end circumferentially spaced apart from a second end and an ear configured to fit into the first pocket to prevent the first piston ring from rotating in the first piston ring groove. The squeeze film damper bearing assembly also includes a second piston ring configured to fit into the second piston ring groove and a stationary housing radially outward of the squirrel cage.

The squeeze film damper bearing assembly of the preceding paragraph can optionally include, additionally and/or alternatively, any one or more of the following features, configurations and/or additional components:

A further embodiment of the foregoing squeeze film damper bearing assembly, wherein the ear of the first piston ring is connected to the first end of the first piston ring.

A further embodiment of any of the foregoing squeeze film damper bearing assemblies, wherein the first piston ring further includes a second ear connected to the second end of the of the first piston ring, wherein the second ear is configured to fit into the first pocket of the squirrel cage to prevent the first piston ring from rotating in the first piston ring groove of the squirrel cage.

A further embodiment of any of the foregoing squeeze film damper bearing assemblies, wherein the first ear of the first piston ring is spaced 90 degrees or 180 degrees from the first end and the second end of the first piston ring.

A further embodiment of any of the foregoing squeeze film damper bearing assemblies, wherein the squirrel cage further includes a second pocket connected to the second piston ring groove.

A further embodiment of any of the foregoing squeeze film damper bearing assemblies, wherein the second piston ring includes a first end circumferentially spaced apart from a second end and a first ear configured to fit into the second pocket to prevent the second piston ring from rotating in the second piston ring groove.

A further embodiment of any of the foregoing squeeze film damper bearing assemblies, wherein the second piston ring further includes a second ear connected to the second end of the of the second piston ring, wherein the second ear is configured to fit into the second pocket of the squirrel cage to prevent the second piston ring from rotating in the second piston ring groove of the squirrel cage.

A further embodiment of any of the foregoing squeeze film damper bearing assemblies, wherein the first ear of the second piston ring is spaced 90 degrees or 180 degrees from the first end and the second end of the second piston ring.

A further embodiment of any of the foregoing squeeze film damper bearing assemblies, wherein the first piston ring and the second piston ring comprise cast iron.

A further embodiment of any of the foregoing squeeze film damper bearing assemblies, wherein the stationary housing comprises titanium.

A further embodiment of any of the foregoing squeeze film damper bearing assemblies, further including a damper annulus between the first piston ring, the second piston ring, the squirrel cage, and the stationary housing.

A further embodiment of any of the foregoing squeeze film damper bearing assemblies, wherein the first piston ring and the second piston ring form a seal between the squirrel cage and the stationary housing to contain oil in the damper annulus.

A squirrel cage assembly according to an exemplary embodiment of this disclosure, among other possible things includes a squirrel cage with a first piston ring groove, a second piston ring groove, a first pocket connected to the first piston ring groove, and a second pocket connected to the second piston ring groove. The squirrel cage assembly also includes a first piston ring configured to fit into the first piston ring groove and a second piston ring configured to fit into the second piston ring grooves. The first piston ring includes a first end circumferentially spaced apart from a second end and a first ear configured to fit into the first pocket to prevent the first piston ring from rotating in the first piston ring groove. The second piston ring includes a first end circumferentially spaced apart from a second end and a first ear configured to fit into the second pocket to prevent the second piston ring from rotating in the second piston ring groove.

The squirrel cage assembly of the preceding paragraph can optionally include, additionally and/or alternatively, any one or more of the following features, configurations and/or additional components:

A further embodiment of the foregoing squirrel cage assembly, wherein the ear of the first piston ring is connected to the first end of the first piston ring.

A further embodiment of any of the foregoing squirrel cage assemblies, wherein the first ear of the second piston ring is connected to the first end of the second piston ring.

A further embodiment of any of the foregoing squirrel cage assemblies, wherein the first piston ring further includes a second ear connected to the second end of the of the first piston ring, wherein the second ear is configured to fit into the first pocket of the squirrel cage to prevent the first piston ring from rotating in the first piston ring groove of the squirrel cage.

A further embodiment of any of the foregoing squirrel cage assemblies, wherein the second piston ring further includes a second ear connected to the second end of the of the second piston ring, wherein the second ear is configured to fit into the second pocket of the squirrel cage to prevent the first piston ring from rotating in the second piston ring groove of the squirrel cage.

A further embodiment of any of the foregoing squirrel cage assemblies, wherein the first ear of the first piston ring is spaced 90 degrees or 180 degrees from the first end and the second end of the first piston ring.

A further embodiment of any of the foregoing squirrel cage assemblies, wherein the first ear of the second piston ring is spaced 90 degrees or 180 degrees from the first end and the second end of the second piston ring.

A further embodiment of any of the foregoing squirrel cage assemblies, wherein the first piston ring and the second piston ring comprise cast iron.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A squeeze film damper bearing assembly comprising:
   a bearing;
   a squirrel cage radially outward of and supporting the bearing, the squirrel cage comprising:
      a first piston ring groove and a second piston ring groove; and
      a first pocket connected to the first piston ring groove;
   a first piston ring configured to fit into the first piston ring groove, the first piston ring comprising:
      a first end circumferentially spaced apart from a second end; and
      an ear configured to fit into the first pocket to prevent the first piston ring from rotating in the first piston ring groove;
   a second piston ring configured to fit into the second piston ring groove;
   a stationary housing radially outward of the squirrel cage.

2. The squeeze film damper bearing assembly of claim 1, wherein the ear of the first piston ring is connected to the first end of the first piston ring.

3. The squeeze film damper bearing assembly of claim 2, the first piston ring further comprising:
   a second ear connected to the second end of the of the first piston ring;
   wherein the second ear is configured to fit into the first pocket of the squirrel cage to prevent the first piston ring from rotating in the first piston ring groove of the squirrel cage.

4. The squeeze film damper bearing assembly of claim 1, wherein the first ear of the first piston ring is spaced 90 degrees or 180 degrees from the first end and the second end of the first piston ring.

5. The squeeze film damper bearing assembly of claim 1, wherein the squirrel cage further comprises a second pocket connected to the second piston ring groove.

6. The squeeze film damper bearing assembly of claim 5, wherein the second piston ring comprises:
   a first end circumferentially spaced apart from a second end; and
   a first ear configured to fit into the second pocket to prevent the second piston ring from rotating in the second piston ring groove.

7. The squeeze film damper bearing assembly of claim 6, the second piston ring further comprising:
   a second ear connected to the second end of the of the second piston ring;
   wherein the second ear is configured to fit into the second pocket of the squirrel cage to prevent the second piston ring from rotating in the second piston ring groove of the squirrel cage.

8. The squeeze film damper bearing assembly of claim 6, wherein the first ear of the second piston ring is spaced 90 degrees or 180 degrees from the first end and the second end of the second piston ring.

9. The squeeze film damper bearing assembly of claim 1, wherein the first piston ring and the second piston ring comprise cast iron.

10. The squeeze film damper bearing assembly of claim 1, wherein the stationary housing comprises titanium.

11. The squeeze film damper bearing assembly of claim 1, further comprising a damper annulus between the first piston ring, the second piston ring, the squirrel cage, and the stationary housing.

12. The squeeze film damper bearing assembly of claim 11, wherein the first piston ring and the second piston ring form a seal between the squirrel cage and the stationary housing to contain oil in the damper annulus.

13. A squirrel cage assembly comprising:
   a squirrel cage comprising:
      a first piston ring groove and a second piston ring groove; and
      a first pocket connected to the first piston ring groove and a second pocket connected to the second piston ring groove;
   a first piston ring configured to fit into the first piston ring groove, the first piston ring comprising:
      a first end circumferentially spaced apart from a second end; and
      a first ear configured to fit into the first pocket to prevent the first piston ring from rotating in the first piston ring groove; and
   a second piston ring configured to fit into the second piston ring groove, the second piston ring comprising:
      a first end circumferentially spaced apart from a second end; and
      a first ear configured to fit into the second pocket to prevent the second piston ring from rotating in the second piston ring groove.

14. The squirrel cage assembly of claim 13, wherein the first ear of the first piston ring is connected to the first end of the first piston ring.

15. The squirrel cage assembly of claim 14, wherein the first ear of the second piston ring is connected to the first end of the second piston ring.

16. The squirrel cage assembly of claim 15, the first piston ring further comprising:
   a second ear connected to the second end of the of the first piston ring;
   wherein the second ear is configured to fit into the first pocket of the squirrel cage to prevent the first piston ring from rotating in the first piston ring groove of the squirrel cage.

17. The squirrel cage assembly of claim 16, the second piston ring further comprising:
   a second ear connected to the second end of the of the second piston ring;
   wherein the second ear is configured to fit into the second pocket of the squirrel cage to prevent the second piston ring from rotating in the second piston ring groove of the squirrel cage.

18. The squirrel cage assembly of claim 13, wherein the first ear of the first piston ring is spaced 90 degrees or 180 degrees from the first end and the second end of the first piston ring.

19. The squirrel cage assembly of claim 18, wherein the first ear of the second piston ring is spaced 90 degrees or 180 degrees from the first end and the second end of the second piston ring.

20. The squirrel cage assembly of claim 13, wherein the first piston ring and the second piston ring comprise cast iron.

* * * * *